(12) United States Patent
Wang

(10) Patent No.: US 7,617,529 B1
(45) Date of Patent: Nov. 10, 2009

(54) ROBUST AND FLEXIBLE GROUP STRUCTURE

(75) Inventor: Dongyan Wang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 10/033,138

(22) Filed: Nov. 2, 2001

(51) Int. Cl.
*G06F 21/00* (2006.01)

(52) U.S. Cl. .......................... 726/21; 726/28

(58) Field of Classification Search .................. 726/15, 726/17, 21, 27–30
See application file for complete search history.

(56) References Cited

U.S. PATENT DOCUMENTS

| | | | | |
|---|---|---|---|---|
| 5,512,885 A | * | 4/1996 | Agestam et al. | 340/825.52 |
| 6,505,300 B2 | * | 1/2003 | Chan et al. | 713/164 |
| 6,999,783 B2 | * | 2/2006 | Toyryla et al. | 455/519 |
| 2002/0150091 A1 | * | 10/2002 | Lopponen et al. | 370/389 |
| 2003/0126137 A1 | * | 7/2003 | McFadden | 707/100 |
| 2005/0015443 A1 | * | 1/2005 | Levine et al. | 709/204 |

FOREIGN PATENT DOCUMENTS

GB  2271913  *  4/1994

* cited by examiner

*Primary Examiner*—Gilberto Barron, Jr.
*Assistant Examiner*—Venkat Perungavoor
(74) *Attorney, Agent, or Firm*—Stolowitz Ford Cowger LLP (57) ABSTRACT

A robust and flexible group structure is described. The group structure is well suited for managing entitlement and security in a network. Moreover, the group structure solves the problems associated with conventional management products. The group structure is designed and implemented with an architecture that provides various desirable capabilities. The group structure has a clear group/group component concept and architecture for business use and IT (information technology) implementation. Moreover, the group structure is modular/component based, which provides the most flexibility and reusability. In addition, the group structure provides a choice of easy group definition or complex, robust group manipulation. Also, the group structure has a clear and easy process to define and maintain group ownership and scope, for example, private groups and public groups. Moreover, the group structure simplifies the task of organizing groups into different hierarchies.

19 Claims, 4 Drawing Sheets

ROBUST AND FLEXIBLE GROUP STRUCTURE

BACKGROUND OF THE INVENTION

1. Field of the Invention

The present invention generally relates to the use and management of groups. More particularly, the present invention relates to providing a robust and flexible group structure for using and managing groups for enterprise security and entitlement.

2. Related Art

Operations with groups are useful in a variety of fields. These group operations serve numerous purposes. In the field of network security, certain group or groups of users can be defined to facilitate authenticating the users and to provide authorized access to resources on the network.

Generally, a business rule represents a particular group of users and the particular resources accessible on the network to this particular group of users. There are many management products for defining business rules. However, this feature (ability to define business rules) cannot be easily and scalably used by business users to create business rules, especially if the business user is a large company, since these management products do not address several issues.

Typically, there is no clear definition/separation of different groups and there is no concept of group components. Moreover, there is no attempt to make groups reusable between different applications on the network. Furthermore, these management products fail to make groups that have ownership attributes and that can be shared. Also, these management products are not flexible and robust enough so that multiple group components can be put together and apart easily. Lastly, there is no structure for organizing the groups.

SUMMARY OF THE INVENTION

A robust and flexible group structure is described. The group structure is well suited for managing entitlement and security in a network. Moreover, the group structure solves the problems associated with conventional management products. The group structure is designed and implemented with an architecture that provides various desirable capabilities. The group structure has a clear group/group component concept and architecture for business use and IT (information technology) implementation. Moreover, the group structure is modular/component based, which provides the most flexibility and reusability. In addition, the group structure provides a choice of easy group definition or complex, robust group manipulation. Also, the group structure has a clear and easy process to define and maintain group ownership and scope, for example, private groups and public groups. Moreover, the group structure simplifies the task of organizing groups into different hierarchies.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, a variety of terms are discussed that refer to the actions and processes of an electronic system or a computer system, or other electronic computing device/system. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, mechanical, or quantum computers.

Exemplary Computer System Environment

Aspects of the present invention can be implemented or executed on a computer system or any other computational system. The computer system may be part of a computer network. Although a variety of different computer systems can be used with the present invention, an exemplary computer system 100 is shown in FIG. 1.

Figure 1:
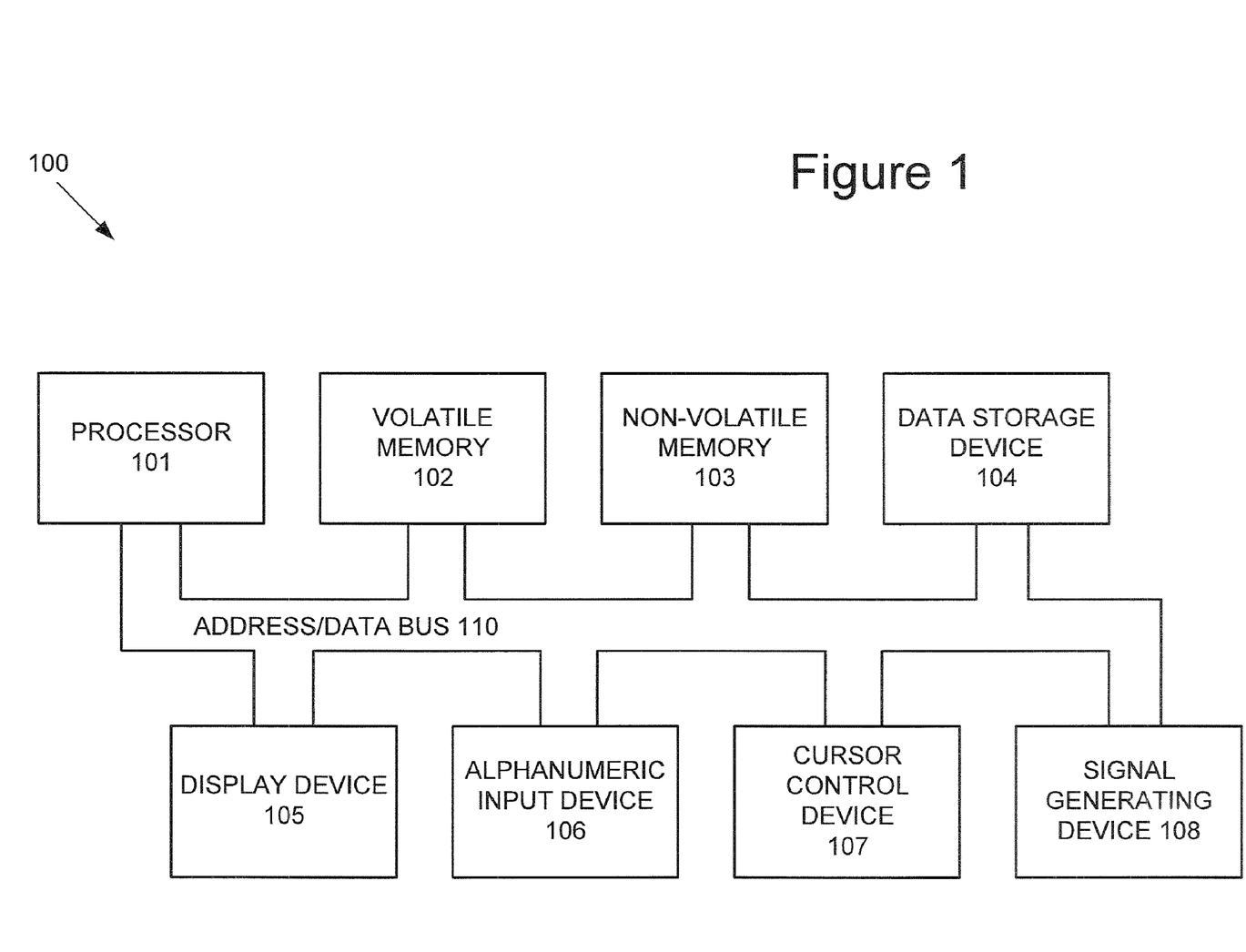
FIG. 1 illustrates an exemplary computer system on which embodiments of the present invention may be practiced.

With reference to FIG. 1, portions of the present invention are comprised of computer-readable and computer executable instructions which reside, for example, in computer-usable media of an electronic system such as the exemplary computer system. FIG. 1 illustrates an exemplary computer system 100 on which embodiments of the present invention may be practiced. It is appreciated that the computer system 100 of FIG. 1 is exemplary only and that the present invention can operate within a number of different computer systems including general-purpose computer systems and embedded computer systems.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 100 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer readable memories. Memory units of computer system 100 include volatile memory 102, non-volatile memory 103 and data storage device 104.

Exemplary computer system 100 can further include a signal generating device 108 (e.g., a network interface card "NIC") coupled to the bus 110 for interfacing with other computer systems. Also included in exemplary computer system 100 of FIG. 1 is an alphanumeric input device 106 including alphanumeric and function keys coupled to the bus 110 for communicating information and command selections to the central processor 101. Exemplary computer system 100 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Group Structure

The robust and flexible group structure of the present invention has many unique features. The group structure is well suited for managing scalable entitlement and security in a network. Specifically, the group structure is well suited for using and managing groups of users. It should be understood that the groups may be other than groups of users. Moreover, the group structure solves the problems associated with conventional management products.

Figure 1A:
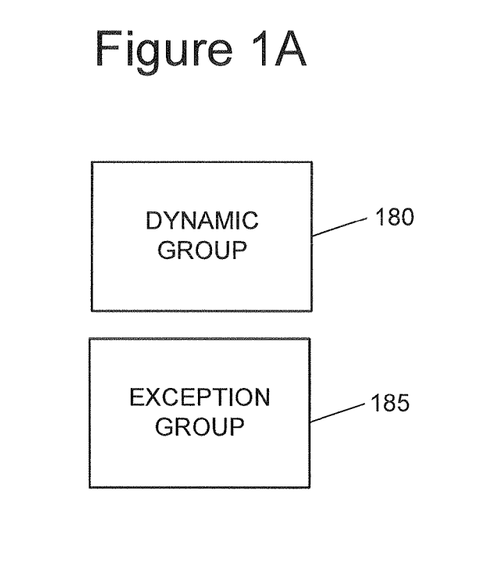
FIG. 1A illustrates various group components in accordance with an embodiment of the present invention.

In particular, the group structure provides several group components, illustrating the component-based nature of the group structure. FIG. 1A illustrates various group components in accordance with an embodiment of the present invention. These group components include a dynamic group 180 and an exception group 185. The dynamic group 180 is systematically created from user information based on selected attributes. One or more expressions for selecting the attributes can be associated with the dynamic group 180. There can be AND, OR relationships between expressions. For example, a particular dynamic group can be defined by the following expressions:

(job title of user) equals buyer, or (Manager) equals Hanson Wang OR (Department) starts with Central Planning, or (Report Chain) includes Hanson Wang AND (use type) equals Manufacturing Internal.

For the first example, the particular dynamic group includes all the users whose job title is "buyer". The second example and the third example are similar but include more than one expression.

The exception group 185 is a static list of users, whereas an identifier of each user (for example, user id) is individually selected when defining the exception group 185. For example, a particular exception group can be the following:

exception group=user1,user2,and user3

Hence, the particular exception group includes user1, user2, and user3. In the group structure of the present invention, the dynamic group 180 and the exception group 185 are the basic components and are utilized to define groups of various group types.

Figure 1B:
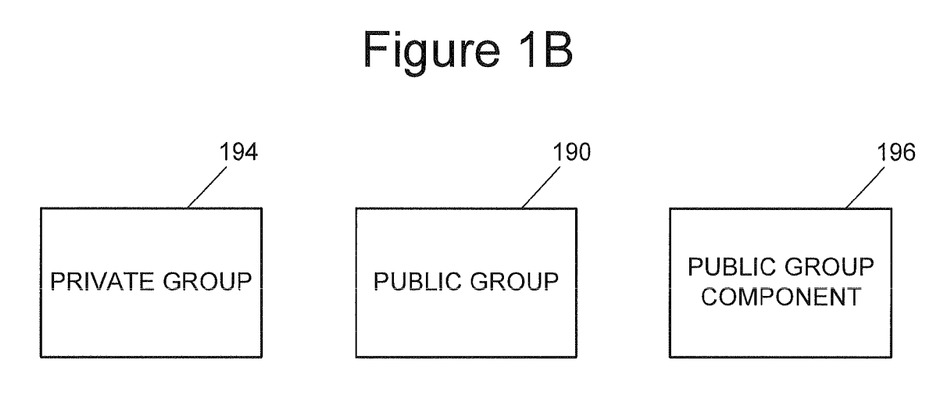
FIG. 1B illustrates various group types in accordance with an embodiment of the present invention.

FIG. 1B illustrates various group types in accordance with an embodiment of the present invention. The various group types include a private group (or own group) 194, a public group 190, and a public group component 196.

The private group 194 is a group created, owned, and maintained by one or more owners, whereas the owners can be specific users. The private group 194 is a group that cannot be shared by the non-owners. Specifically, the private group 194 is configured for use by the owner(s) and is unavailable to use for non-owners. In particular, a private group 194 is comprised of either a dynamic group 180 or an exception group 184 and cannot be the combination of a dynamic group 180 and an exception group 184. In an embodiment of the present invention, there is a naming convention to conveniently distinguish different types of groups. For example, if the private group 194 is comprised of a dynamic group 180, the name of the private group 194 begins with "dg_". In an embodiment of the present invention, if the private group 194 is comprised of an exception group 184, the name of the private group 194 begins with "eg_".

The public group component 196 is a special private group. The purpose of this special group is to distinguish normal private groups from private groups being used as components of a public group. This additional abstraction prevents mistaken changes to the public groups by accidentally changing the group components of the public group. The public group component 196 is a group owned and managed by one or more owners, whereas the owners can be specific users. The public group component 196 is a group that cannot be shared by the non-owners. Specifically, the public group component 196 is configured for use by the owner(s) and is unavailable to use for non-owners. In a system (e.g., computer system 100 of FIG. 1) implementing the group structure of the present invention, the public group component 196 is created to facilitate creating a public group 190. In essence, one or more public group components 196 are used to generate a public group 190, whereas the contents of each public group component 196 is generated based on the contents of a corresponding private group 194 used to define the public group 190. In particular, a public group component 196 is comprised of either a dynamic group 180 or an exception group 184. The public group component 196 cannot be the combination of a dynamic group 180 and an exception group 184. In an embodiment of the present invention, there is a naming convention to conveniently distinguish different types of groups. For example, if the public group component 196 is comprised of a dynamic group 180, the name of the public group component 196 begins with "pdgc_" (public dynamic group component). In an embodiment of the present invention, if the public group component 196 is comprised of an exception group 184, the name of the public group component 196 begins with "pegc_" (private exception group component). Since the public group component 196 is used as part of a public group 190, which is a group that can be viewed and shared by the owners as well as non-owners, the described naming convention ensures that the owner(s) will maintain the public group component 196 and will avoid changing the public group component 196 accidentally to the detriment of non-owners that rely on the public group 190 associated with the public group component 196.

The public group 190 is a group that is owned and managed by one or more owners, whereas the owners can be specific users. Moreover, the public group 190 is a group that can be viewed and shared by the owners as well as non-owners. Specifically, the public group 190 is configured for use by the public, i.e., the owner(s) and non-owners. In a system (e.g., computer system 100 of FIG. 1) implementing the group structure of the present invention, the public group 190 is created once components (i.e., one or more private groups) for the public group 190 have been defined and selected. In particular, at least one private group 194 is used as a component to define a public group 190. The public group 190 is defined by selecting private groups 194 as follows:

$$\{+[\text{private group(s)}]_{dynamic} - [\text{private group(s)}]_{dynamic} + [\text{private group(s)}]_{exception} - [\text{private group(s)}]_{exception}\} \rightarrow \text{generate a public group,}$$

whereas the "[ ]" is used to indicate optional components; the "+" is used to indicate that the component is an additive type (or include); and the "−" is used to indicate that the component is a subtractive type (or exclude). Thus, the public group 190 may be defined by including or excluding one or more dynamic-type private groups, one or more exception-type private groups, or any combination thereof. The "+" associated with the private group indicates that the contents of the private group are to be included in defining the public group 190. The "−" associated with the private group indicates that the contents of the private group are to be excluded in defining the public group 190. As will be described below, for each private group 194 used as a component to define the public group 190, a corresponding public group component 196 having the contents of the private group 194 is generated, whereas the public group component is a special type of private group. The public group 190 is then generated using the corresponding public group components 196 as follows:

$$\text{Public group} = +[\text{public group component(s)}]_{dynamic} - [\text{public group component(s)}]_{dynamic} + [\text{public group component(s)}]_{exception} - [\text{public group component(s)}]_{exception}.$$

In an embodiment of the present invention, the name of the public group 190 begins with "pg_". For example, the notation pg_1=dg_1+dg_3−dg_4+eg_1−eg_2 indicates that in defining the public group pg_1, include the contents of the dynamic-type private groups dg_1 and dg_3 and the contents of the exception-type private group eg_1 but exclude the contents of the dynamic-type private group dg_4 and the contents of the exception-type private group eg_2. Similarly, the notation pg_2=dg_7 indicates that in defining the public group pg_2, include the contents of the dynamic-type private group dg_7. Also, the notation pg_3=eg_9−eg_11 indicates that in defining the public group pg_3, include the contents of the exception-type private group eg_9 but exclude the contents of the exception-type private group eg_11. As stated above, public group components are used instead of private groups to provide a layer of abstraction; therefore, the real situation of the above exemplary public groups is as follows:

$$pg\_1 = pdgc\_1 + pdgc\_3 - pdgc\_4 + pegc\_1 - pegc\_2$$

$$pg\_2 = pdgc\_7$$

$$pg\_3 = pegc\_9 - pegc\_11.$$

Figure 2:
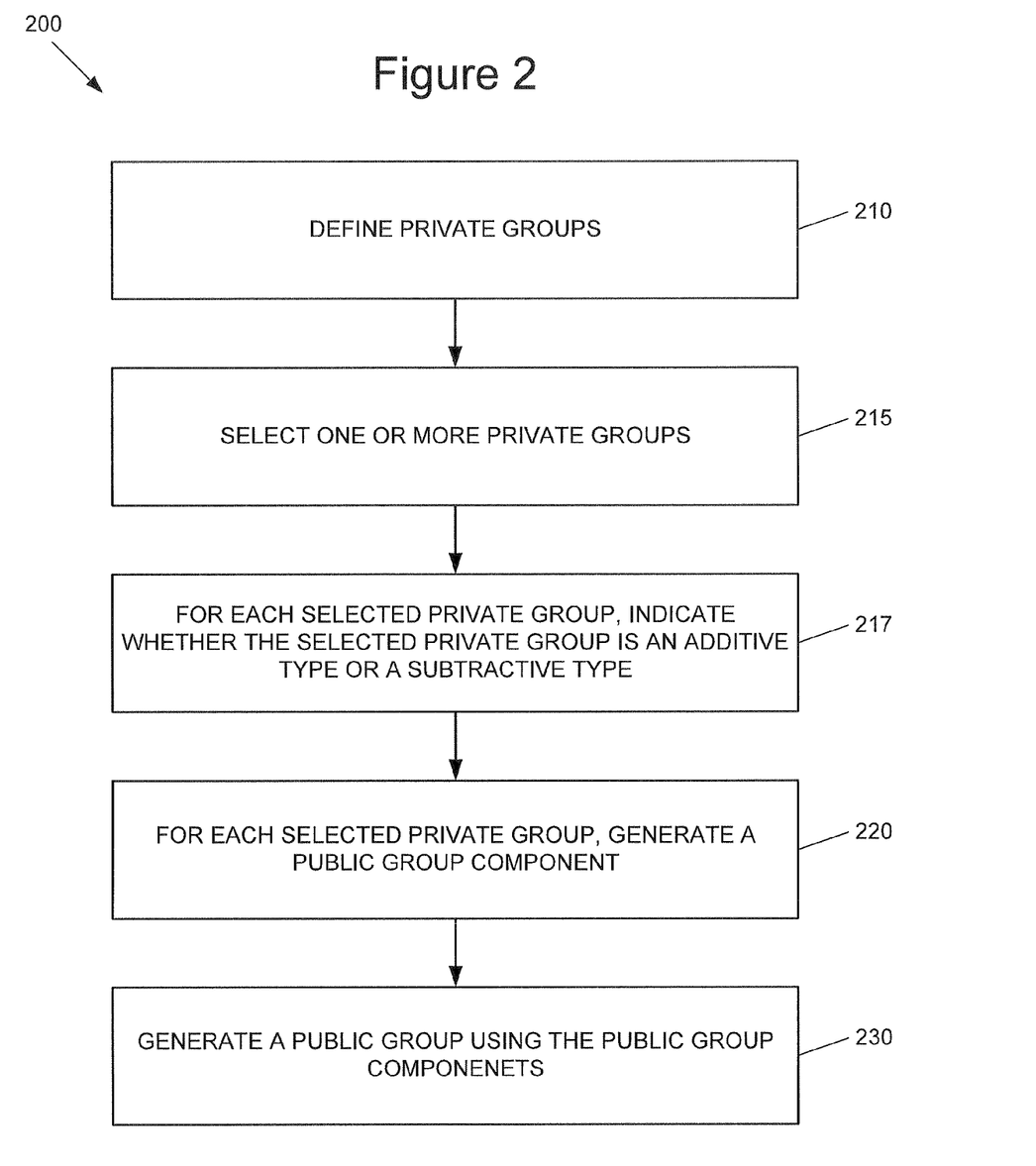
FIG. 2 illustrates a flow chart showing a method of defining a public group in accordance with an embodiment of the present invention.

FIG. 2 illustrates a flow chart showing a method 200 of defining a public group in accordance with an embodiment of the present invention. Aspects of the method illustrated in FIG. 2 may be implemented with a software application.

At block 210, the private groups are defined. As described above, the private groups are created, owned, and maintained by one or more owners, whereas the owners can be specific users. The private group cannot be shared by the non-owners. A private group can be comprised of a dynamic group or an exception group, as described above.

Continuing, at block 215, one or more particular private groups are selected for defining the public group, whereas the private group owner can access the private groups he/she owns to make the selection. At block 217, for each selected particular private group, it is indicated whether the selected particular private group is an additive type (or include) or a subtractive type (or exclude). Alternatively, an approval process may be initiated before proceeding to block 220. At block 220, for each selected particular private group, a corresponding public group component is generated as a copy of the private group with the same group content and ownership, but with a different group name. For example, the new public group component name can be prefixed by pdgc_ or pegc_ and postfixed by a timestamp to distinguish different copies of public group components generated from the same private group. Specifically, the content of each selected particular private group is copied and utilized in generating the corresponding public group component. Each public group component is added to the corresponding selected private group owner's list of owned groups. By this way, the owner knows that the public group component is used as part of a public group, and will maintain the public group component and will avoid changing the public group component accidentally to the detriment of non-owners that rely on the public group associated with the public group component.

At block 230, the public group is generated using the public group components. In essence, the public group components serve as components for the public group.

The group structure is designed and implemented with an architecture that provides various desirable capabilities. The group structure has a clear group concept and architecture for business use and IT (information technology) implementation. Moreover, the group structure is modular/component based, which provides the most flexibility and reusability. Therefore, the group structure provides a choice of easy group definition or complex, robust group manipulation. Also, the group structure has a clear and easy process to define and maintain private groups and public groups, so there is good balance between reusing public groups for a global scope and isolating private groups for a smaller scope. Moreover, the group structure simplifies the task of organizing groups into different hierarchies.

In an embodiment, the owner of each group (e.g., private group, public group component, and public group component) can be identified by user identifiers, such as user ids. The group owner information is stored with the particular group (e.g., private group, public group component, and public group component). Changing group ownership may be handled by a delegation process.

Since a public group is comprised of public group components, a public group is modified by modifying its public group component(s). A private group or a public group component is modified by modifying its dynamic group or exception group directly, for example, change the expression of a dynamic group, or a list of user ids for an exception group. Since the group structure of the present invention emphasizes component-based groups and reuse of components by multiple groups and by multiple applications, the group structure provides a robust, flexible, and scalable solution because a change/update can be propagated through the group structure by making the change/update to a component of the group.

Since a variety of groups for a large enterprise can be defined using the group structure of the present invention, it may be more convenient to organize these groups into multiple hierarchy trees. The group structure of the present invention facilitates forming different hierarchies such as a division group hierarchy (e.g., manufacturing, consumer, supplier), a function group hierarchy (e.g., finance, planning, supply chain), or a cross function group hierarchy. As long as the public groups are defined clearly, it is not difficult to organize the groups into hierarchies. The public/private concept integrated into the group structure of the present invention enables users to share groups which are defined as public groups while maintaining the privacy and security of groups defined as private groups and public group components. Thus, multiple users can share the public groups. Moreover, multiple applications or resources on the network can share the public groups of users (for creating business rules) unlike the conventional management products where each application or resource on the network needs its own defined groups of users (for creating business rules) that may not be shared with other applications or resources on the network. This group structure can be used for many purposes, for example but not limited, enterprise security/entitlement purpose, role management, HR (human resources) administration, etc.

Figure 3:
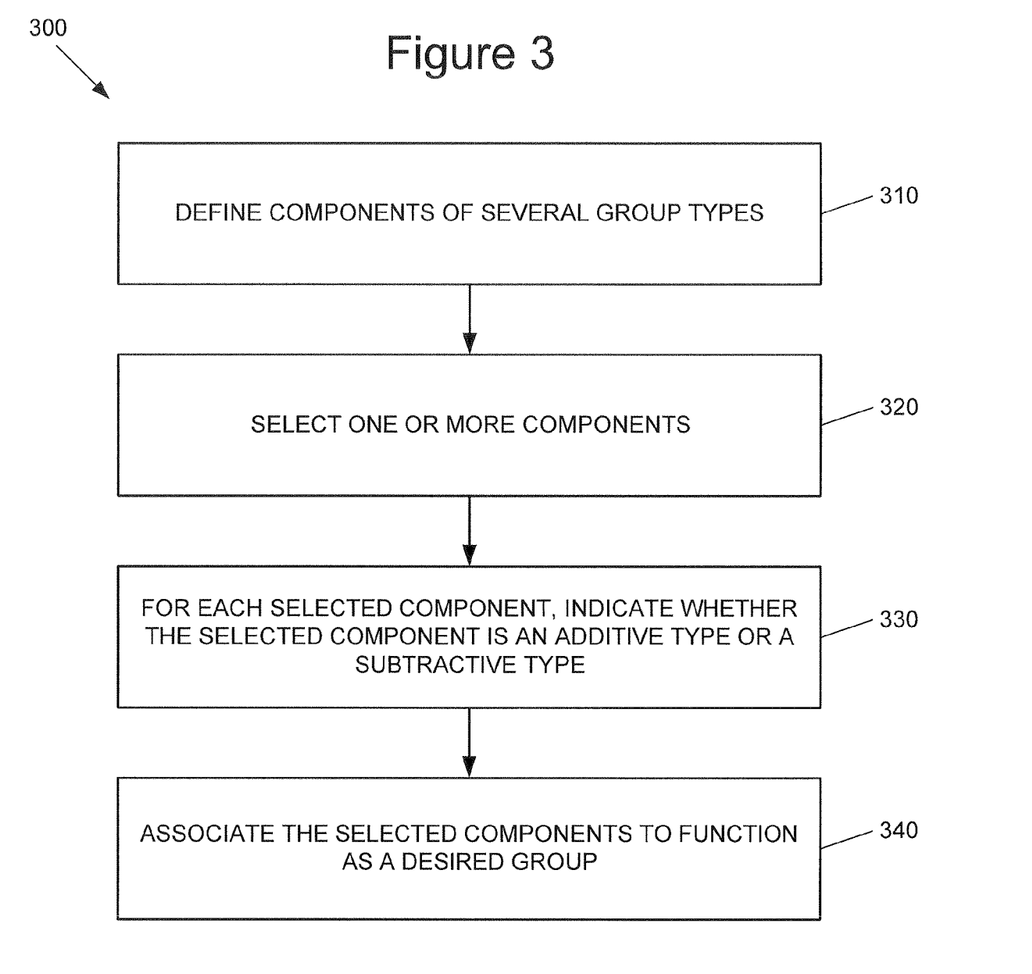
FIG. 3 illustrates a flow chart showing a method of creating a desired group in accordance with an embodiment of the present invention.

FIG. 3 illustrates a flow chart showing a method 300 of creating a desired group in accordance with an embodiment of the present invention. In this method, a public group can be used as a component of another group. Aspects of the method illustrated in FIG. 3 may be implemented with a software application. The desired group may be created for defining a particular business rule.

At block 310, one or more components of several group types are defined. The possible group types are public group and private group. As described above, the private group is configured for use by its owner and is unavailable to use by a non-owner. The public group is configured for use by its owner and a non-owner. Thus, the public group can be shared and viewed by others.

At block 320, one or more particular components are selected for defining the desired group, whereas the set of private groups and public groups from which the selection is made is dependent on the group owner making the selection. This group owner has access to its owned private groups, public groups, and public group components as well as the non-owned public groups. Generally, if there is a useful public group available, this public group is selected. Moreover, by defining one or more dynamic-type private groups (for include cases and for exclude cases) and one or more exception-type private groups (for include cases and for exclude cases), the contents of the public group can be combined with the contents of the dynamic-type private group(s) and the exception-type private group(s) as components for the desired group.

Furthermore, at block 330, for each selected particular component, it is indicated whether the selected particular component is an additive type (or include) or a subtractive type (or exclude). At block 340, each selected component and each indicated type are associated such that to function as the desired group. The desired group will be the combination of these selected particular components, but it is not necessary to combine these selected particular components into a private group or a public group because these selected particular components can be individually selected when defining a business rule. In this way, the owner/user can best reuse modular components with much flexibly in multiple applications. The desired group is defined by selecting components as follows:

desired group=[public group(s)]−[public group(s)]+ [private group(s)]$_{dynamic}$−[private group(s)]$_{dynamic}$+[private group(s)]$_{exception}$−[private group(s)]$_{exception}$, whereas the "[ ]" is used to indicate optional components, the "+" is used to indicate that the component is an additive type (or include), and the "−" is used to indicate that the component is a subtractive type (or exclude). Thus, the desired group may be defined by selecting one or more public groups, one or more dynamic-type private groups, one or more exception-type private groups, or any combination thereof. The "+" associated with a group indicates that the contents of the group are to be included in defining the desired group. The "−" associated with a group indicates that the contents of the group are to be excluded in defining the desired group.

Some examples of desired groups definitions using public groups are:

desired group 1=pg_1 desired group 2=pg_2+eg_1 desired group 3=pg_10−eg_1 desired group 4=*pg*_2+*dg*_7 desired group 5=*pg*_7−*dg*_2 desired group 6=*pg*_9+*dg*_8+*eg*_3 desired group 7=*pg*_9−*pg*_10+*dg*_8+*dg*_9−*dg*_10+*eg*_3−*eg*_4

The notation "desired group 1=pg_1" indicates that in defining the desired group 1, include the contents of the public group pg_1. The notation "desired group 2=pg_2+eg_1" indicates that in defining the desired group 2, include the contents of the public group pg_2 and the contents of the exception-type private group eg_1. The notation "desired group 3=pg_10−eg_1" indicates that in defining the desired group 3, include the contents of the public group pg_10 but exclude the contents of the exception-type private group eg_1. The notation "desired group 4=pg_2+dg_7" indicates that in defining the desired group 4, include the contents of the public group pg_2 and the contents of the dynamic-type private group dg_7. The notation "desired group 5=pg_7−dg_2" indicates that in defining the desired group 5, include the contents of the public group pg_7 but exclude the contents of the dynamic-type private group dg_2. The notation "desired group 6=pg_9+dg_8+eg_3" indicates that in defining the desired group 6, include the contents of the public group pg_9, the contents of the dynamic-type private group dg_8, and the contents of the exception-type private group eg_3. The notation "desired group 7=pg_9−pg_10+dg_8+dg_9−dg_10+eg_3−eg_4" indicates that in defining the desired group 7, include the contents of the public group pg_9, the contents of the dynamic-type private groups dg_8 and dg_9, and the contents of the exception-type private group eg_3, but exclude the contents of the public group pg_10, the contents of the dynamic-type private group dg_10, and the contents of the exception-type private group eg_4.

Some examples of desired groups definitions not using public groups are:

desired group 11=*dg*_1 desired group 12=*dg*_1+*dg*_2 desired group 13=*eg*_1 desired group 14=*eg*_1−*eg*_2 desired group 15=*dg*_1+*eg*_1 desired group 16=*dg*_1+*eg*_1−*eg*_2

The notation "desired group 11=dg_1" indicates that in defining the desired group 11, include the contents of the dynamic-type private group dg_1. The notation "desired group 12=dg_1+dg_2" indicates that in defining the desired group 12, include the contents of the dynamic-type private groups dg_1 and dg_2. The notation "desired group 13=eg_1" indicates that in defining the desired group 13, include the contents of the exception-type private group eg_1. The notation "desired group 14=eg_1−eg_2" indicates that in defining the desired group 14, include the contents of the exception-type private group eg_1 but exclude the contents of the exception-type private group eg_2. The notation "desired group 15=dg_1+eg_1" indicates that in defining the desired group 15, include the contents of the dynamic-type private group dg_1 but exclude the contents of the exception-type private group dg_1. The notation "desired group 16=dg_1+eg_1−eg_2" indicates that in defining the desired group 16, include the contents of the dynamic-type private group dg_8 and the contents of the exception-type private group eg_1 but exclude the contents of the exception-type private group eg_2.

The group structure of the present invention can facilitate creating business rules across multiple applications for enterprise security and entitlement purpose. A business rule can be created by defining the desired group of users using the public and/or private components (e.g., public group and private group) and by associating one or more network security privileges (or particular resources accessible on the network) with the desired group of users. Moreover, flexibility and reusability of group definitions is promoted since group components of users can be used in multiple applications and/or by multiple users while maintaining the desired security and privacy attributes for these group components of users.

Those skilled in the art will recognize that portions of the present invention may be incorporated as computer instructions stored as computer program code on a computer-readable medium such as a magnetic disk, CD-ROM, and other media common in the art or that may yet be developed.

Finally, aspects of the present invention can be implemented as an application, namely, a set of instructions (e.g., program code) which may, for example, be resident in the random access memory of a computer system. Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. In addition, although the various methods of the present invention described above can be conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:

electronically receiving, with an interface device, a definition of a first group identifying a first plurality of users;

automatically generating, with a processing system, the first group having the first plurality of users according to the definition of the first group, where the first group is a private group having content available to one or more owners of the first group and unavailable to non-owners of the first group;

electronically receiving, with the interface device, a definition of a second group identifying a second plurality of users;

automatically generating, with the processing system, the second group having the second plurality of users according to the definition of the second group, where the second group is a private group having content available to one or more owners of the second group and unavailable to non-owners of the second group;

receiving a definition of a desired group with the interface device, where the definition of the desired group explicitly specifies that the first group is to be included in the desired group and explicitly specifies the second group is to be excluded from the desired group; and automatically generating, with a processing system, the desired group to include the first group and exclude the second group according to the received definition of the desired group, where the desired group includes the content of the first group, where the desired group is a public group allowing the content of the first group to be available to both the owners of the first and second groups and the non-owners of the first and second groups.

2. The method of claim 1 where the definition of the first group or the second group identifies one or more properties shared by the users in the first group or the second group; and dynamically generating the first group or the second group according to the received definition.

3. The method of claim 1 where the definition of the first group or the second group statically defines the users in the group; and generating the first group or the second group according to the received definition.

4. The method of claim 1 includes electronically receiving a definition of a third group of a plurality of users, where the third group is a public group having content available to both the owners of the first and second groups and the non-owners of the first and second groups; and electronically receiving a definition of a desired public group, where the definition of the desired public group specifies that the first group and the third group are to be included in the different desired group and the second group is to be excluded from the desired public group, where the desired group includes the content of the first group and the third group.

5. The method of claim 1 includes electronically receiving a definition of a third group of a plurality of users, where the definition of the desired group specifies that the first group and the third group are to be included in the desired group and the second group is to be excluded from the desired group.

6. The method of claim 1 includes electronically receiving a definition of a third group of a plurality of users, where the definition of the desired group specifies that the first group is to be included in the desired group and the second group and the third group are to be excluded from the desired group.

7. An apparatus comprising a computer-readable medium having instructions, when executed by a computational system including a processor or multiple communicating processors, cause the computational system to:

generate, with the computational system, a first group having a first plurality of users according to a definition of the first group received with an interface device of the computational system, where the first group is a private group having content available to one or more owners of the first group and unavailable to non-owners of the first group;

generate, with the computational system, a second group having a second plurality of users according to a definition of the second group received with the interface device of the computational system, where the second group is a private group having content available to one or more owners of the second group and unavailable to non-owners of the second group; and generate, with the computational system, a desired group to include the first group and exclude the second group according to a definition of the desired group received with the interface device of the computational system, where the desired group includes the content of the first group, where the desired group is a public group allowing the content of the first group to be available to both the owners of the first and second groups and the non-owners of the first and second groups.

8. The apparatus of claim 7 where the definition of the first group or the second group identifies one or more properties shared by the users in the first group or the second group, and where the computational system is configured to dynamically generate the first group or the second group according to the received definition.

9. The apparatus of claim 7 where the definition of the first group or the second group statically defines the users in the group, and where the computational system is configured to generate the first group or the second group according to the received definition.

10. The apparatus of claim 7 where the computational system is configured to:

receive a definition of a third group of a plurality of users, where the third group is a public group available to both the owners of the first and second groups and the non-owners of the first and second groups; and receive a definition of a desired public group, where the definition of the desired public group specifies that the first group and the third group are to be included in the different desired group and the second group is to be excluded from the desired public group, where the desired group includes the content of the first group and the third group.

11. The apparatus of claim 7 where the computational system is configured to receive a definition of a third group of a plurality of users, where the definition of the desired group specifies that the first group and the third group are to be included in the desired group and the second group is to be excluded from the desired group.

12. The apparatus of claim 7 where the computational system is configured to receive a definition of a third group of a plurality of users, where the definition of the desired group specifies that the first group is to be included in the desired group and the second group and the third group are to be excluded from the desired group.

13. A device comprising:

an interface to receive definitions of a plurality of groups, each group specifying a plurality of items and indicating that the group is either available for inclusion into a desired group or not available for inclusion into the desired group, where a definition of the desired group explicitly specifies that a first group is to be included in the desired group and explicitly specifies a second group is to be excluded from the desired group, where the first group is a private group having content available to one or more owners of the first group and unavailable to non-owners of the first group, where the second group is a private group having content available to one or more owners of the second group and unavailable to non-owners of the second group; and a processing system to generate a desired group from at least one of the plurality of groups available for inclusion into the desired group and exclude all of the plurality of groups not available for inclusion into the desired group according to the received definition of the desired group, where the desired group includes the content of the first group, where the desired group is a public group allowing the content of the first group to be available to both the owners of the first and second groups and the non-owners of the first and second groups.

14. The device of claim 13 where the definition of the at least one of the plurality of groups identifies one or more properties shared by the items in the group, where the processing system is configured to generate the group according to the received definition.

15. The device of claim 13 where the definition of the at least one of the plurality of groups statically defines the items in that group, and where the processing system is configured to generate the group according to the received definition.

16. The device of claim 13 where the processing system is configured to generate another desired group from at least one of the plurality of groups available for inclusion into the another desired group and the previously generated desired group, the processing system excluding all of the plurality of groups not available for inclusion into the desired group.

17. The device of claim 13 where the processing system is configured to manage security of communications over a network according to at least one of the desired group or the plurality of groups, the processing system to manage security of communications over a network by associating one or more network security privileges or resources accessible on the network with the desired group or the plurality of groups.

18. The apparatus of claim 7 where the definition explicitly specifies that the first group is to be included in the desired group and explicitly specifies the second group is to be excluded from the desired group.

19. The device of claim 13 where the definition explicitly specifies that the first group is to be included in the desired group and explicitly specifies the second group is to be excluded from the desired group.

* * * * *

UNITED STATES PATENT AND TRADEMARK OFFICE
CERTIFICATE OF CORRECTION

| | | |
|---|---|---|
| PATENT NO. | : 7,617,529 B1 | Page 1 of 1 |
| APPLICATION NO. | : 10/033138 | |
| DATED | : November 10, 2009 | |
| INVENTOR(S) | : Dongyan Wang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Nineteenth Day of October, 2010

David J. Kappos
*Director of the United States Patent and Trademark Office*